United States Patent

[11] 3,621,899

| [72] | Inventor | Frank M. Hula<br>5201 Hamm Ave., Cleveland, Ohio 44127 |
|---|---|---|
| [21] | Appl. No. | 864,627 |
| [22] | Filed | Oct. 8, 1969 |
| [45] | Patented | Nov. 23, 1971 |

[54] CONVERTIBLE HAND UTENSIL
6 Claims, 4 Drawing Figs.

[52] U.S. Cl. .................................................... 146/43 R,
146/204, 30/280, 30/339, 30/342
[51] Int. Cl. ............................................................ A47j 17/00,
A47j 25/00
[50] Field of Search .............................................. 146/203,
204, 3 A, 3 B, 38, 52; 30/329, 278, 333, 280, 337,
339, 340, 341, 342, 344; 145/61 J, 108

[56] References Cited
UNITED STATES PATENTS
1,474,107  11/1923  Dalton et al. ................   30/339

| 2,637,904 | 5/1953 | Springer ...................... | 30/337 X |
| 3,324,548 | 6/1967 | Mascia ........................ | 30/329 X |
| 3,345,743 | 10/1967 | Paulson et al. .............. | 30/342 X |

*Primary Examiner*—Willie G. Abercrombie
*Attorney*—Meyer, Tilberry and Body

ABSTRACT: A convertible hand utensil comprising a handle having an internal passageway in communication with the lower end thereof and extending upward therefrom throughout at least a portion of the handle. There is further provided retaining means releasably received in the internal passageway for detachably connecting a variety of implements to the handle. The retaining means has an outer surface and at least one implement locating projection which extends outwardly therefrom. The convertible hand utensil may also include an additional internal passageway which is in communication with the upper end of the handle and extends downward therefrom throughout at least a portion thereof.

PATENTED NOV 23 1971 3,621,899
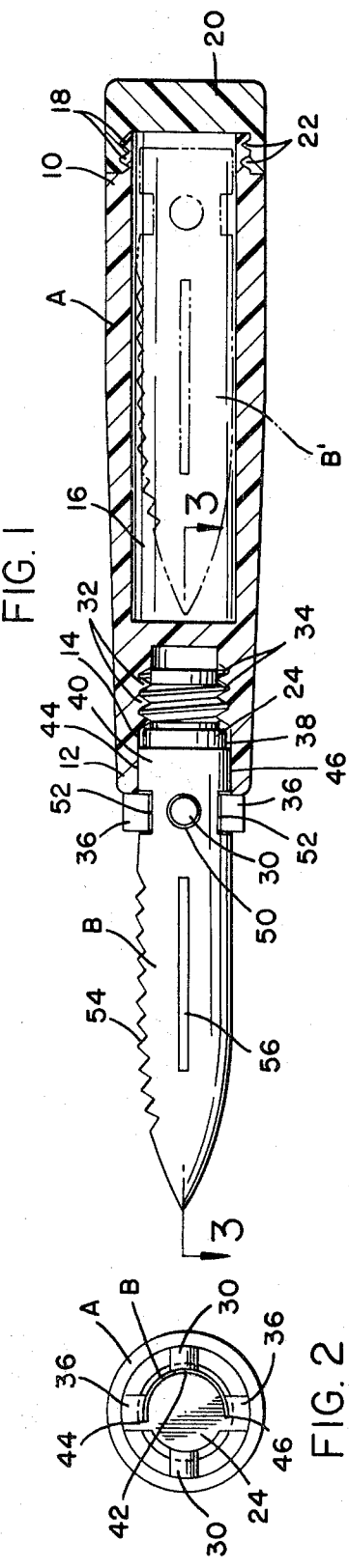
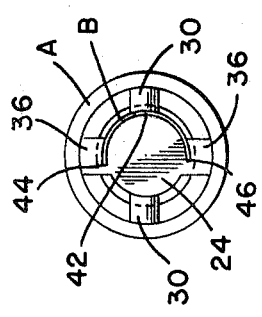
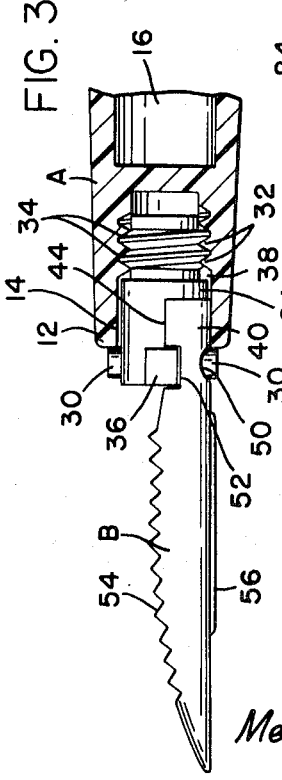
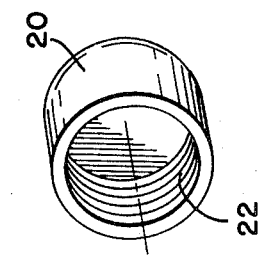
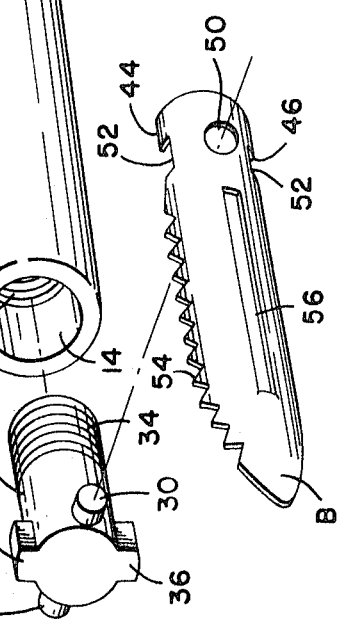
INVENTOR.
FRANK M. HULA
BY
Meyer, Tilberry & Body
ATTORNEYS

CONVERTIBLE HAND UTENSIL

This invention pertains to the utensil art and more particularly to a convertible hand utensil.

The invention is particularly applicable to kitchen utensils, such as peelers, corers and cutting tools, and will be described with specific reference thereto; however, it is to be appreciated that the invention has broader applications and may be used for any tool or utensil which has a handle portion and an implement portion extending outward therefrom.

Heretofore kitchen utensils, and specifically peelers, have comprised a unitary apparatus including a handle portion and an implement portion extending outwardly from one end thereof. Due to the high sales volume and low cost of such devices, it has been the practice of many manufacturers to construct the implement portion from relatively low quality material having a short use life. As such, the user finds that after a short period of time the implement portion is no longer suitable for the purpose intended and must be replaced. Although the implement portion has become inoperative, the handle portion generally remains in excellent condition and hence quite serviceable. Unfortunately, due to the unitary construction heretofore employed by manufacturers, the user must necessarily discard both the implement portion and the handle portion, thereby increasing his overall replacement cost. While the replacement cost of a single utensil is generally low, the overall cost can become quite high due to the large number of various utensils commonly found in the household. It is not uncommon to find a housewife purchasing replacement utensils at the rate of one per month.

In addition to the replacement cost problem, there also exists a substantial problem of inconvenience. For example, in the case of a peeler, the housewife finds that the peeler has become too dull for further use in the midst of preparing the family's meal, or at some other inconvenient time. The housewife is then faced with the task of making a special trip to the store to purchase a replacement peeler, thereby interrupting the orderly routine of running the household.

The present invention contemplates a new and improved apparatus which overcomes all of the above-referred problems and others, and provides a convertible hand utensil which is simple and economical to manufacture and has an extensive use life.

In accordance with the present invention there is provided a convertible hand utensil comprising: a handle having upper and lower ends; a first internal passageway in communication with the lower end and extending upward therefrom throughout at least a portion of the handle; retaining means releasably received in the first internal passageway for detachably connecting a variety of implements to the handle; the retaining means having an outer surface and at least one implement locating projection extending outwardly from the surface.

In accordance with a more limited aspect of the invention, there is provided a convertible hand utensil further including a second internal passageway in communication with the upper end and extending downward therefrom throughout at least a portion of the handle, and a cap releasably retained on the upper end for sealing the second internal passageway, whereby the second internal passageway defines a compartment for the storage of implements.

The principal object of the present invention is to provide a convertible hand utensil having a handle portion and an interchangeable implement portion releasably connected to the handle portion, whereby when the implement portion becomes worn out it can be easily replaced without the necessity of also replacing the handle portion.

Another object of the present invention is to provide a convertible hand utensil wherein a single permanent handle is constructed so as to permit its releasable connection to a wide variety of implements.

An additional object of the present invention is to provide a convertible hand utensil wherein the handle also serves as a storage compartment for implements.

A further object of the present invention is to provide a convertible hand utensil which has a relatively low initial cost and is adapted to be used in conjunction with inexpensive replacement implements.

A still further object of the present invention is to provide a convertible hand utensil which may be rapidly and easily manufactured.

These and other objects and advantages will become apparent from the following description used to illustrate the preferred embodiment of the invention when read in conjunction with the accompanying drawings in which:

FIG. 1 is a longitudinal cross-sectional view of a convertible hand utensil built in accordance with the preferred embodiment of the present invention;

FIG. 2 is an end view of the convertible hand utensil illustrated in FIG. 1;

FIG. 3 is a partial side elevational view of the convertible hand utensil illustrated in FIG. 1; and FIG. 4 is an exploded perspective view of the convertible hand utensil illustrated in FIG. 1.

Referring now to the drawings wherein the showings are for the purpose of illustrating the preferred embodiment of the invention only and not for the purpose of limiting same, FIGS. 1–4 show a convertible hand utensil constructed in accordance with the present invention and having a handle A and an implement B detachably connected to the handle. Although the implement B has been shown in the form of a peeler, it is to be appreciated that a wide variety of other implements could be used in conjunction with the handle A, such as a corer, parer, scraper, grater, or knife blade.

The handle A is elongated in shape and includes an upper end 10 and a lower end 12. In accordance with the present invention there is provided a first internal passageway, shown as an implement connecting chamber 14, in communication with the lower end 12 and extending upward therefrom throughout at least a portion of the handle A. There is further provided a second internal passageway, shown as a storage compartment 16, which is in communication with the upper end 10 and extends downward therefrom throughout at least a portion of the handle A. The upper end 10 of the handle A is provided with external threads 18 and a cap 20 having internal threads 22 is releasably secured thereon for sealing the storage compartment 16. In this manner the handle A provides a facility for storing additional implements which are not presently in use, such as the implement B' shown in dashed lines in FIG. 1.

In accordance with the present invention there is provided retaining means for detachably connecting a variety of implements to the handle A which may take many forms; however, in the preferred embodiment it takes the form of a mounting plug 24 having at least one implement locating projection 30 extending outwardly from the outer surface thereof. The innermost portion of the implement connecting chamber 14 is provided with threads 32 and the rear end portion of the mounting plug 24 is similarly provided with threads 34, whereby the mounting plug may be releasably retained within the connecting chamber. Preferably, the mounting plug 24 has a pair of opposed locating projections 30 and a pair of opposed implement locking projections 36, the projections being alternately disposed on the front end portion of the mounting plug and extending radially outward therefrom. However, it is to be appreciated that various other combinations of locating projections 30 and locking projections 36, other than the preferred arrangement as illustrated in FIGS. 1–4, could be successfully employed to detachably connect the implement B to the handle A. The locating projections 30 are generally annular in shape while the locking projections 36 are generally rectangular in shape. Although the projections 30, 36 could be separately fabricated and secured to the mounting plug 24, in the preferred embodiment they are shown as being integral therewith, thereby providing a mounting plug which is durable and less susceptible to misalignment. The diameter of the mounting plug 24 is predetermined so that when inserted into the implement connecting chamber 14 and retained therein, a gap 38 exists between the wall of the chamber and the outer surface of the plug. The thickness of the gap 38 substantially corresponds to the thickness of the implement B, whereby when the implement is supported on the mounting plug 24 and the latter is inserted into the connecting chamber 14, the implement will be securely retained on the handle A.

The implement B includes an end portion 40 having a contact surface 42 (as shown in FIG. 2) and a pair of opposed edges 44, 46. The contact surface 42 is generally configured to conform to a portion of the outer surface of the mounting plug 24. A generally annular opening 50 is provided in the end portion 40 of the implement B and it extends inwardly from the contact surface 42 through the implement for receiving one of the implement locating projections 30. There is further provided a generally rectangular slot 52 in each of the opposed edges 44, 46 for receiving the implement locking projections 36 when the implement B is supported on the mounting plug 24. Thus, when the implement B is properly located and supported on the mounting plug 24 and the foregoing assembly received in the connecting chamber 14, the implement is prevented from being displaced either linearly or rotationally.

In FIGS. 1-4 the implement B is shown as a peeler having a serrated edge portion 54 and a bladelike member 56 extending longitudinally throughout a portion of the implement. It is to be appreciated that a variety of other implements could be employed, as heretofore discussed, provided they have an end portion 40 which includes a contact surface 42 generally conforming to a portion of the outer surface of the mounting plug 24 and further including an annular opening 50.

Reference is made to FIGS. 1-4 wherein there is shown a convertible hand utensil constructed in accordance with the present invention whose operation will now be described in greater detail. In order to attach the implement B to the handle A, it is first necessary to remove the mounting plug 24 from the implement connecting chamber 14. The implement B is then located on the mounting plug in such a manner that the implement locating projection 30 extends through the annular opening 50 in the end portion 40 of the implement. Additionally, in this position the implement locking projections 36 will engage the rectangular slots 52 on the opposed edges 44, 46 of the implement B. In view of this locating and locking arrangement, the implement B is prevented from being displaced either linearly or rotationally. The mounting plug 24 with the implement B supported thereon is now inserted and screwed into the implement connecting chamber 14. When this operation is completed the implement B will have its end portion 40 located in the gap 38 and will be firmly secured to the handle A.

In order to change implements, the foregoing procedure is merely reversed, the new implement installed and the mounting plug 24 once again secured in the connecting chamber 14. It should be noted that additional implements, such as implement B', may be stored in the compartment 16 of the handle A, thereby facilitating the changing of implements by making the procedure easier and faster.

Although the invention has been described with reference to specific embodiments, variations within the scope of the following claims will be apparent to those skilled in the art.

I claim:

1. A convertible hand utensil comprising:
    an elongated handle having upper-and-lower ends;
    a first internal passageway in communication with said lower end extending upwardly therefrom throughout at least a portion of said handle and including a threaded portion at least partially therealong;
    retaining means releasably received in said first internal passageway for detachably connecting a variety of implements to said handle, said retaining means including front and rear portions, and an outer surface, said outer surface having a pair of implement locating projections and a pair of implement locking projections alternately disposed thereon and extending outwardly therefrom at said front portion, said outer surface of said rear end portion being threaded for engagement with said threaded portion of said first internal passageway.

2. The convertible hand utensil defined in claim 1, further including a second internal passageway in communication with said upper end and extending downward therefrom throughout at least a portion of said handle and a cap releasably retained on said upper end for sealing said second internal passageway, whereby said second internal passageway defines a compartment for the storage of implements.

3. The convertible hand utensil defined in claim 1, wherein said locating projections are generally annular and said locking projections are generally rectangular.

4. The convertible hand utensil defined in claim 3, further including an implement having an end portion with a contact surface and a pair of opposed edges, said contact surface generally conforming to a portion of said outer surface of said retaining means, a generally annular opening extending inwardly from said contact surface through said end portion for receiving one of said implement locating projections, and a generally rectangular slot disposed in each of said opposed edges for receiving said implement locking projections, whereby said implement is prevented from being displaced either linearly or rotationally while carried by said retaining means.

5. The convertible hand utensil defined in claim 4, wherein said implement is a peeler, said peeler having at least one serrated edge and a bladelike member extending longitudinally throughout a portion thereof.

6. The convertible hand utensil defined in claim 1, wherein said locating and locking projections are integral with said retaining means.

* * * * *